United States Patent

Berger

[15] 3,647,542
[45] Mar. 7, 1972

[54] SOLID-FLUID BATTERY

[72] Inventor: Carl Berger, Santa Ana, Calif.

[73] Assignee: McDonnell Douglass Corporation, Santa Monica, Calif.

[22] Filed: Dec. 19, 1966

[21] Appl. No.: 603,019

[52] U.S. Cl. ................136/6, 136/143, 136/145, 136/146
[51] Int. Cl. ...............H01m 35/04, H01m 3/02, H01m 3/04
[58] Field of Search.................136/142, 143, 145, 147, 100, 136/132, 167, 166, 86, 120, 6, 146, 36, 37, 38, 43, 102, 30, 20, 58, 59; 204/295-297

[56] References Cited

UNITED STATES PATENTS

| | | | |
|---|---|---|---|
| 3,021,379 | 2/1962 | Jackel | 136/146 |
| 413,339 | 10/1889 | Eickemeyer | 136/162.5 |
| 3,198,990 | 8/1965 | Katzin | 317/100 |
| 3,287,164 | 11/1966 | Arrance | 136/30 |
| 3,021,379 | 2/1962 | Jackel | 136/146 |
| 2,981,783 | 4/1961 | Bushrod | 136/146 |
| 3,083,250 | 3/1963 | Geissbauer | 136/38 |
| 3,228,798 | 1/1966 | Hart | 136/86 |
| 3,266,940 | 8/1966 | Caesar | 136/86 |
| 3,379,570 | 4/1968 | Berger | 136/6 |

FOREIGN PATENTS OR APPLICATIONS 197,204   5/1923   United Kingdom...................136/145

*Primary Examiner*—Winston A. Douglas
*Assistant Examiner*—Peter D. Rosenberg
*Attorney*—Max Geldin

[57] ABSTRACT

An electrode-separator unit in the form of a nonmetallic honeycomb matrix, e.g., of porous organic or inorganic material, and having first catalyst electrode material, e.g., platinum, and second active battery electrode material, e.g., zinc, separately contained in cells of the honeycomb matrix. A fluid operable battery incorporating the above honeycomb electrode-separator unit.

14 Claims, 8 Drawing Figures

INVENTOR.
CARL BERGER
BY
Max Geldin
ATTORNEY

SOLID-FLUID BATTERY

This invention relates to batteries, particularly high energy density batteries, and is especially concerned with an improved solid-gas battery combination fabricated in the form of a unit which can be readily assembled in a case, with suitable electrical connections, to form an efficient battery. Particularly, the invention is directed to the production of a solid-gas battery construction, such as the so-called zinc-air battery, incorporating a novel form of separator having superior strength, versatility and efficiency.

Batteries are an important source of energy storage for power generation. In addition to the common lead-acid storage battery, an important type of battery particularly suited for airborne applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead-acid storage batteries.

More recently there have been developed related high energy density solid-fluid batteries, particularly so-called zinc-air batteries or cells employing as one electrode an active battery type electrode such as a zinc electrode and as the second electrode a catalyst electrode such as platinum. Such a battery operates by bringing a gas such as oxygen or air into contact with the catalyst electrode, causing the gas to react with the active battery electrode and generate an electric current. A cell of this type has the characteristics of both a fuel cell and a battery. Cells of this type such as the zinc-air battery are disclosed in my copending application Ser. No. 495,865, filed Oct. 14, 1965.

In addition to important airborne applications, high energy density batteries including the solid-gas batteries, e.g., the zinc-air battery, have many other applications such as in portable tools and appliances, television, radio and record players, engine starting, portable X-ray units, and the like. In such batteries, it is conventional to employ a separator or membrane, e.g., in the form of a porous member, between the electrodes. The separator performs the function of retaining electrolyte, e.g., potassium hydroxide, separating the electrode, and preventing migration of electrode ions or growth of dendritic crystals of electrode ions which short circuit the battery. Also, particularly in the case of solid-gas batteries such as the zinc-air battery, the separator can be in the form of a membrane composed of a solid ion exchange material which per se functions as an ion conducting material in the absence of an electrolyte.

Such separators or membranes can be constructed of either inorganic or organic materials, the preferred separators usually being inorganic separators. Improved inorganic separators particularly suited for use in high energy density batteries are described, for example, in the copending application of Carl Berger and Frank C. Arrance, Ser. No. 499,274, filed Oct. 21, 1965. Such inorganic separators, preferably in the form of ceramic separators, when assembled in a battery of this type, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperatures, e.g., of the order of 100° C. and above.

However, in connection with the development particularly of inorganic separators in the form of thin ceramic membranes, due to the thinness of such membranes it has been difficult to produce large ceramic membranes for use in larger batteries and also it has been difficult to form these membranes into various shapes and configurations. Thus, while the smaller configurations have proved highly successful, scale-up to larger dimensions using thin ceramic membranes is difficult particularly in the case of planar membranes. This is particularly true for large zinc-air or oxygen batteries. It is also difficult to increase the energy density of such high energy density cells using conventional plate and separator configurations.

When employing conventional separators or ion conducting members in the form of plates or membranes, it is also necessary when assembling such separators in a battery, together with the necessary electrodes or electrode plates, to mount the individual separators in properly spaced relation to provide electrode compartments between adjacent separators, and to then insert the electrodes in the electrode compartments between an adjacent pair of separators. This not only requires proper spacing of the separators so as to receive the electrodes therebetween in relatively snug fitting relation, but also requires that the electrode compartments on opposite sides of a separator be properly insulated to prevent short circuiting of electrolyte from one electrode compartment around a separator and into the adjacent electrode compartment. Further, when employing certain types of electrodes such as zinc electrodes which tend to slump or change shape in a relatively short period of time because of mechanical or electrochemical deterioration, it is often necessary to support such electrodes between adjacent separators forming the electrode compartment, to provide an electrode of suitable strength to withstand satisfactory periods of operation.

Conventional organic separator plates and membranes have been found deficient because of inferior strength characteristics tending toward rapid deterioration and failing of such organic separators, resulting in poor wet stand, internal shorting and limited useful life.

Accordingly, it is an object of the present invention to provide an electrode-separator unit for a fluid or gas operable battery, particularly embodying an improved form of separator, which affords ease of assembly of such unit in a battery and which when assembled in a battery automatically provides electrodes and electrode compartments which are substantially fully insulated from each other, and wherein the electrodes are supported by the separator assembly, so as to provide a sturdy efficiently operating battery unit.

It is a particular object of the invention to provide an electrode-separator unit for a fluid or gas operable battery or combination, particularly a zinc-air or oxygen battery in which the separator or ion conducting membrane has superior strength characteristics, and possesses superior versatility for production in various sizes and shapes, which permits the production of batteries of varying sizes, and improves the energy density output of the battery.

I have found that the above objects can be accomplished by employing as a separator or membrane of a solid-fluid, e.g., a solid-gas, battery such as a zinc-air battery, a nonmetallic honeycomb, with catalyst and active battery electrode materials being positioned in the cells of the honeycomb. The nonmetallic honeycomb wall between the cells containing the catalyst and active electrode materials provides a suitable separator membrane to permit electrolyte ions to pass or be conducted through such honeycomb wall, but prevents electrode ions from migrating through such wall or membrane.

Thus, there is provided according to the present invention an electrode-separator unit, particularly designed for a fluid or a gas operable battery, which comprises a nonmetallic honeycomb matrix, a first catalyst electrode material positioned in the honeycomb matrix and a second active battery electrode material positioned in the honeycomb matrix, these electrode materials being separated by the honeycomb wall. Thus, the respective electrode materials are disposed in different cells of the honeycomb matrix, each of such electrode materials being disposed in one or more cells of the matrix. Preferably, the catalyst electrode material is positioned in a first series of cells of said honeycomb matrix and the second active battery electrode material is positioned in a second series of cells of said honeycomb matrix. Also, preferably the cells containing said second battery electrode material are adjacent to the cells containing said first catalyst electrode material. Thus, in preferred practice the cells containing one electrode material, e.g., the second active electrode material noted above, are in alternate juxtaposition with respect to the cells containing the first catalyst electrode material, whereby adjacent first and second electrode materials or electrodes of opposite polarity are separated from each other by a single cell wall. The cell or cells containing the first catalyst electrode material contain a free fluid or gas diffusion space therein to permit diffusion of a fluid or gas into such cells for contact of said gas with the catalyst electrodes.

Although the honeycomb or honeycomb matrix can be formed of an organic material such as a synthetic resin having suitable porosity characteristics, in preferred practice for obtaining substantially greater strength and efficiency, the honeycomb matrix is formed of a porous substantially rigid inorganic material, particularly a porous ceramic material. In addition to enhanced rigidity and strength of the honeycomb separator matrix, the honeycomb can be shaped in any desired manner to produce any desired configuration. Further, due to the geometry of the honeycomb, greater energy density is obtained. Also, large batteries can be produced when employing the invention principles, which can function either as high rate primary or secondary batteries.

The employment of a honeycomb matrix as the separator according to the invention, also has the important advantage that it permits the provision of a unit externally of the battery by first filling the cells of the honeycomb with the suitable electrode materials. When so assembled, an electrode-separator pack or unit is provided in which each of the electrode compartments is fully insulated from the adjacent electrode compartments by the honeycomb cell walls and wherein each of the electrodes is supported by the surrounding cell walls of the honeycomb, preventing slumping or disintegration of the electrode materials, e.g., zinc, within its compartment. One or preferably both ends of the cells containing the active battery electrode material, e.g., the zinc electrodes, can be covered by a suitable insulation material to close the ends of the respective cells containing the electrode material. Thus when assembling the unit of the invention in a battery, there is avoided the problem when employing individual separators or membranes and electrodes, of requiring first the proper supporting of such individual separators in suitably spaced relation to provide electrode compartments, and the introduction of the individual electrodes in such compartments, and there is also avoided the necessity under these conditions for providing means to properly insulate adjacent electrode compartments from each other.

The invention will be more clearly understood by reference to the description below of certain preferred embodiments of the invention taken in connection with the accompanying drawing, wherein.

Figure 1:
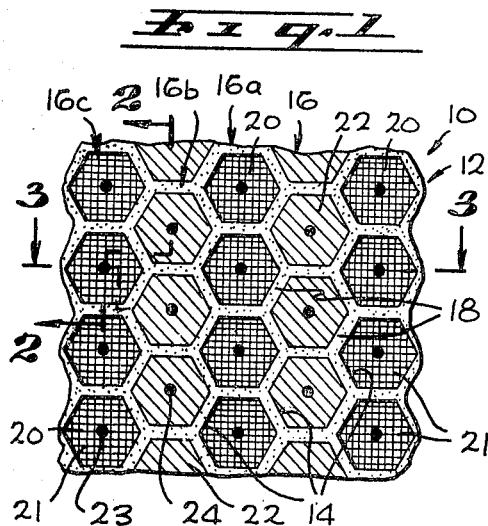
FIG. 1 is a cross-sectional schematic representation of a unit for a zinc-air battery employing a honeycomb matrix according to the invention.

The showings in the drawing are exaggerated for purposes of greater clarity.

Figure 3:
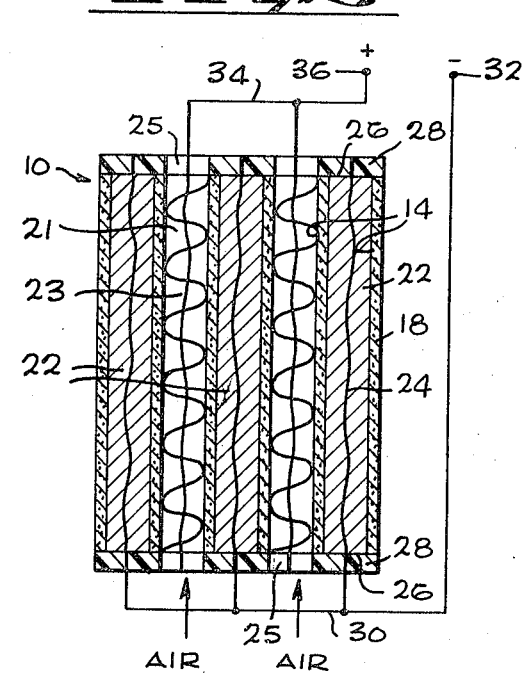
FIG. 3 is a section taken on line 3—3 of FIG. 1.

In carrying out the invention for obtaining the improved zinc-air battery unit indicated at 10 in FIGS. 1 and 3, a porous nonmetallic honeycomb matrix 12, e.g., an aluminum oxide matrix, is first provided. The cells 14 of the honeycomb, here shown as hexagonal cells, are filled with electrode material according to the invention.

Thus, for producing a zinc-air high energy density battery, the respective rows 16, 16a, 16b, 16c, etc. of cells 14 are arranged to have alternate zinc and so-called air or catalyst electrodes; that is, each cell 14 of alternate rows of cells 16 and 16b contain zinc electrodes 22, and each cell 14 of the intermediate alternate rows of cells 16a and 16c contain air or catalyst electrodes 20. Thus, the cells containing zinc electrode material are disposed adjacent the cells containing the catalyst electrode material, the cell wall 18 between adjacent zinc and catalyst-containing cells forming the separator between these electrodes of opposite polarity.

Figure 2:
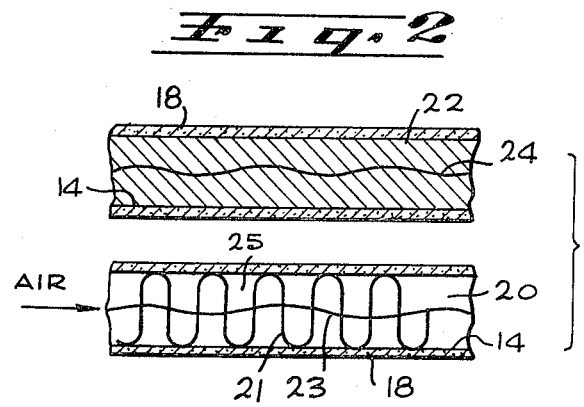
FIG. 2 is a sectional detail of the cells containing the catalyst and active electrodes, taken on line 2—2 of FIG. 1.
Figure 2A:
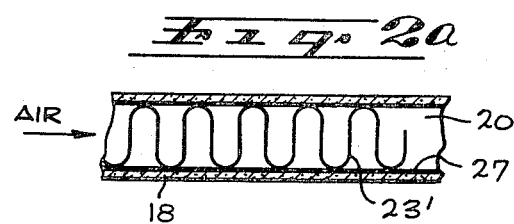
FIG. 2a is a detail showing of an alternative type of catalyst electrode arrangement.

Referring to FIG. 2 showing the air or catalyst electrodes 20 and the zinc electrodes 22 in greater detail, the catalyst electrodes are provided by inserting into the air cells 14 of alternate rows 16a and 16c, a catalyst material such as platinum, or platinum black in the form of a screen 21 such as a tantalum screen impregnated with platinum. A collector or collector wire 23 is preferably also inserted into the air cells in contact with the catalyst screen 21, wire 23 extending beyond the ends of the air cells for attachment of suitable electrical connections. Sufficient free space is provided in the cells around the screens 21 and 23 to provide an air passage 25 in the cells containing the catalyst electrodes 20. Alternatively, as illustrated in FIG. 2a, the catalyst material, e.g., platinum or platinum black, can be coated on the walls of the air cells as indicated at 27 in FIG. 2a, and the collector screen or wire 23' forced into snug engagement with the catalyst coating 25 to provide efficient contact.

Zinc electrodes 22, which are preferably in the form of zinc dust or powder, are obtained in the cells 14 of alternate rows of cells 16 and 16b, and a metallic collector wire 24, or a collector screen, e.g., a silver screen, is embedded in and passes through the respective zinc electrodes and extending beyond the ends of the cells. Alternatively, zinc sheet in rolled form can be inserted into the appropriate cells to form the zinc electrodes.

Referring to FIG. 3, the ends 26 of the zinc-containing cells or compartments of the honeycomb are covered with an insulation material 28, which can be any suitable type of plastic or synthetic resinous material such as vinyls, epoxies and the like, which have suitable electrical insulation characteristics. An electrical lead or connection 30 is connected to each of the collector wires 24 of the zinc electrodes 22 contained in the cells of the honeycomb, and lead 30 in turn is connected to the negative terminal or anode 32, and a common electrical connection or lead 34 is connected to each of the collector wires 23 of the catalyst electrodes 20 in the cells of the honeycomb, and lead 34 is in turn connected to a positive terminal or cathode 36.

As previously noted, the honeycomb matrix 12 is preferably formed of an inorganic material. Inorganic battery separator type materials which can be used to form the porous honeycomb 12 can include a variety of substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. Such hydrous metal oxide separator materials and their method of preparation are described in the copending application Ser. No. 379,093, filed June 30, 1964, of Carl Berger et al. A preferred separator of this type is hydrous zirconium oxide or zirconia.

Other porous inorganic materials which can be employed for producing the separator according to the invention include the aluminosilicates, particularly the alkali metal and alkaline earth metal aluminosilicates, alumina and silica, particularly because of their formation of a hard ceramic material upon sintering, while still retaining suitable porous characteristics. The aluminosilicates are particularly preferred in this respect. Examples of such aluminosilicates, include aluminosilicate, sodium and potassium aluminosilicates, and magnesium, calcium, barium and strontium aluminosilicates. These materials can be used separately, but often mixtures of these aluminosilicates are used, e.g., complex mixtures of both the alkali metal and alkaline earth metal aluminosilicates. Such inorganic separator materials are described in the copending U.S. applications Ser. No. 378,858, filed June 29, 1964, and Ser. No. 499,294, filed Oct. 21, 1965, of Carl Berger et al.

Another useful class of inorganic separator materials are the naturally occuring clay minerals of the kaolinite group. This is a group of naturally occuring clays containing aluminum oxide and silica usually together with bound water, and having the formula $Al_2O_3 \cdot 2SiO_2 \cdot 2H_2O$. In addition to kaolinite, other useful members of this group include the mineral clays halloysite, dickite, nacrite and anauxite.

Other types of inorganic separator materials which can be employed include those in the form of a sintered porous member composed of a solid solution of magnesium silicate and zinc silicate, or a solid solution of magnesium silicate and iron silicate as described and claimed in the copending application Ser. No. 539,554, filed Apr. 1, 1966, of Frank C. Arrance, et al. (Docket 299), and the inorganic separator materials in the form of a sintered porous member composed of a solid solution of an aluminum-bearing material such as aluminum oxide, and a substance selected from the group consisting of chromium, cobalt, nickel, magnesium, calcium and iron bearing materials, e.g., a mixture of alumina and chromic oxide, as described and claimed in copending application Ser. No. 555,891, filed June 7, 1966 of Frank C. Arrance et al. (Docket 348).

The term "ceramic material" as employed herein is intended to denote types of inorganic materials such as those noted above. Accordingly, a ceramic material of suitable porosity characteristics forms the preferred honeycomb matrix according to the invention.

Various types of known procedures can be employed for producing the preferred porous ceramic honeycomb. Thus, for example, according to one procedure a cardboard or other organic honeycomb can be soaked or immersed in a ceramic slip, e.g., containing aluminum oxide, and then fired. The porosity of the cardboard and the concentration of the ceramic slip control the initial porosity. During firing, the cardboard or other organic material is decomposed and is removed, leaving a ceramic honeycomb whose final porosity can be adjusted by subsequent firing. Alternative procedures can be employed, such as by extrusion through a die, by pressing, casting and hydrostatic pressing.

Although not preferred, an organic honeycomb matrix can be employed in the invention. Suitably inert organic materials or plastics having suitable porosity characteristics which can be employed include, for example, microporous plastics such as nylon, Dynel (vinyl-acrylic copolymer), Teflon (polytetrafluoroethylene), cellophane or regenerated cellulose, and the like. Although such organic honeycombs can be employed, the strength, chemical inertness and electrode support characteristics of the inorganic or ceramic honeycombs are significantly superior.

The porosity of the materials of which the honeycomb matrix is composed should be such that the walls of the honeycomb function to retain electrolyte, and permit transfer of electrolyte ions but prevent transfer of electrode ions, such as zinc ions. The honeycomb cell walls preferably have a porosity in the range from about 5 to about 50 percent, usually about 10 to about 30 percent. The above noted porous inorganic ceramic materials in particular have such porosity characteristics. The thickness of the cell walls, e.g., 18, of the honeycomb matrix, particularly where an inorganic honeycomb is employed, can range, for example, from about 0.005 to about 0.050 inch, although this range is only understood to be exemplary.

In filling the cells of the honeycomb with the active battery electrode material, the electrode material, e.g., in the form of a paste or powder such as zinc oxide paste or zinc power can be forced into the cells, as by tamping. Alternatively, this can be accomplished by placing a vacuumtight tool over the honeycomb to enable evacuation of the honeycomb, and when so evacuated, the electrode material can be injected into the honeycomb cells in any suitable manner. After the honeycomb is filled with the electrode paste or powder such electrode materials are permitted to set and dry. Suitable insulation is then provided over the ends of the cells containing the active electrodes, as indicated at 28 in FIG. 3, employing organic resins such as epoxies, polyvinyl resins and rubber type material such as Neoprene-type compounds and ethylene-propylene rubbers for this purpose. The resulting unit including the catalyst and active electrodes incorporated into the honeycomb as above described, is then incorporated in a battery with suitable electrical connections, as more fully described below.

Any conventional type of suitable catalyst material can be employed to form the catalyst electrodes in the honeycomb according to the invention. Such catalyst materials include platinum, palladium, iridium, nickel boride, cobalt boride, and the like.

Any type of active battery electrode materials can be employed to form the battery unit employing a honeycomb matrix according to the invention. As anodic electrode materials these include, for example, zinc, cadmium and lithium. As cathodic electrode materials these include, for example, silver oxide, copper oxide, manganese dioxide and cadmium oxide.

After incorporation of the catalyst and active electrode materials into the cells of the honeycomb, and prior to positioning the insulating covers 28 over the end faces of the honeycomb to close the ends of the cells containing the active, e.g., zinc electrodes, suitable electrolyte solutions, e.g., an aqueous potassium hydroxide solution, can be introduced into the honeycomb to impregnate the walls thereof and the active, e.g., zinc, electrode material, by vacuum soaking or by other conventional procedures with suitable precautions being taken to prevent introduction of free electrolyte into the fluid or gas passages of the catalyst electrode compartments, to prevent flooding thereof.

Where the honeycomb matrix is formed of an ion exchange material, and such material itself functions as the electrolyte to conduct the ions, an electrolyte solution need not be employed. Such ion exchange materials, include, for example, aluminum vanadates, thorium phosphates and zirconium phosphates. Also, organic ion exchange materials such as polystyrene type ion exchange materials can be employed. Hence, the term "ion conducting," referring to the material of which such a honeycomb can be formed, is intended to denote ion exchange materials as exemplified above.

Various fluids can be employed as fuels to power the battery of the invention by passage of such fluid through the gas diffusion passages, e.g., 25, of the honeycomb cells containing the catalyst electrodes. Preferably, such fluids are gases, which include, for example, air or oxygen, hydrogen, gaseous hydrocarbons such as propane, and halogens such as chlorine or bromine. Also, liquids can be employed as the fluid for reaction at the catalyst electrodes, including, for example, hydrazine, liquid hydrocarbons, and the like. The particular electrode combinations can be chosen for the particular fluid or gas, e.g., air or oxygen, to be employed as fuel.

Figure 4:
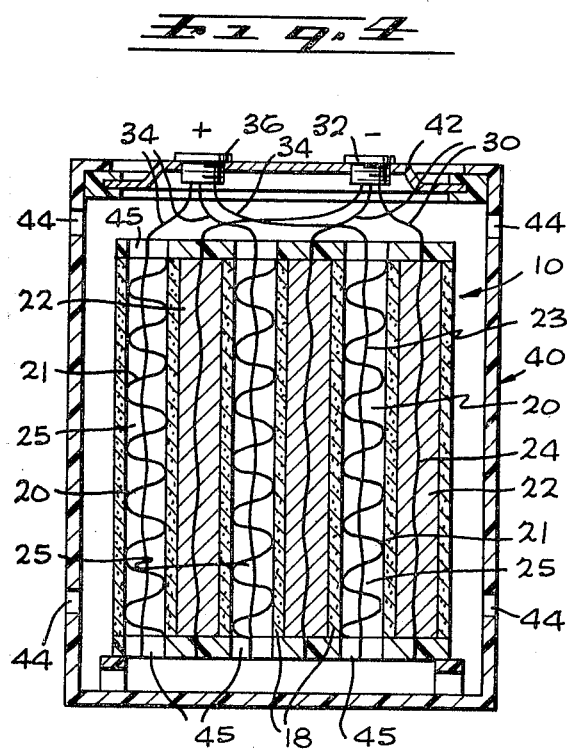
FIG. 4 shows the manner of assembly of the unit of FIG. 1 according to the invention, to form a battery.

Referring now to FIG. 4 of the drawing, the unit 10 of FIGS. 1, 2 and 3, composed of the honeycomb matrix filled with the zinc and catalyst electrode materials, can be assembled in a battery case 40 by means of suitable electrical connections. As shown in FIG. 4, the electrical connections or leads 34 from each of the catalyst electrodes 20 are connected to the terminal 36 mounted on the cover 42 of the battery, and the electrical connections 30 from each of the zinc electrodes 22 are connected to the terminal 32 similarly mounted on the cover 42 of the battery. The battery case 40 contains suitable openings or ports 44 to permit air to enter the case and to diffuse into the passages 25 of the honeycomb cells containing the catalyst electrodes.

In the operation of the zinc-air battery described above and illustrated in FIG. 4, the air entering the ports 44 in the battery and passing through the open ends 45 of the cells containing the catalyst electrodes 20, and diffusing through the passages 25 therein, impinges on the catalyst electrodes 21. At the catalyst electrodes, the oxygen is reduced and simultaneously the zinc of the zinc electrodes is oxidized to zinc oxide, and hydroxyl ions are transported through the walls 18 of the honeycomb generating a current. The battery can function either as a primary battery or as a secondary battery. In the latter case, following a period of discharge, the battery is charged by passage of a current therethrough, to reconvert the zinc oxide to the zinc anodes, and generating oxygen at the catalyst cathodes 20.

It will be noted that a fluid operable battery such as the zinc-air battery described above and produced according to the invention, has characteristics of both a battery and a fuel cell. Thus, the fluid operable battery of the invention employs a catalyst electrode and a fluid, e.g., a gas such as air or oxygen, to contact such catalyst electrode and power the battery. On the other hand, the battery employs an active battery electrode such as a zinc electrode which during the period of discharge is chemically converted, for example, from zinc to zinc oxide, and then from zinc oxide back to zinc.

The following are examples of practice of the invention.

EXAMPLE 1

A zinc-air battery unit as described above and illustrated in FIGS. 1, 2 and 3 is prepared employing an aluminum oxide inorganic separator having a porosity of about 20 percent. Alternate rows of cells have inserted therein a rolled tantalum screen impregnated with platinum black, together with a collector screen in contact with the tantalum screen. In intermediate alternate rows of cells of the honeycomb there is inserted rolled metal zinc. The thus filled honeycomb matrix is then vacuum filled with 30 percent potassium hydroxide solution, but with no free electrolyte in the free gas diffusion spaces provided in the cells containing the tantalum screens, and the ends of the zinc anode compartments are covered with an epoxy insulation covering as indicated at 28 in FIG. 3.

The resulting zinc-air battery unit employing the honeycomb matrix is assembled in a battery as generally illustrated in FIG. 4 and the cell is discharged at a 20 ma. rate for 30 hours. The initial voltage of the cell is 1.24 volts and remains above 1.0 volts for 24 hours, and decreases gradually thereafter to 0.52 volts. The cell is recharged at a 2.4 voltage limit and the cycle is repeated. This test demonstrates the capability of the invention system for use in both primary and secondary high energy density battery systems.

EXAMPLE 2

A porous aluminum oxide honeycomb has alternate rows of cells coated on the walls thereof with platinum black. In such cells there are inserted metal collector screens in secure engagement with the platinum black walls of the cells. Intermediate rows of cells of the honeycomb are filled with zinc powder, with a collector screen embedded therein. The resulting matrix containing the electrode materials is then filled by vacuum filling with 30 percent potassium hydroxide solution, but with no free electrolyte in the gas diffusion spaces of the cells containing the platinum black catalyst coating, and vinyl insulation covers positioned as at 28 in FIG. 3 over the opposite end of the cells containing the zinc anode powder.

The resulting zinc-catalyst unit formed in the inorganic honeycomb matrix is assembled in a battery as illustrated generally in FIG. 4. The battery is then discharged and charged over a number of one-half hour discharge - one-half hour charge cycles both at ambient and at elevated temperature of about 100° C. The battery operates satisfactorily over these discharge-charge cycles.

EXAMPLE 3

A porous inorganic honeycomb formed of a solid solution of magnesium silicate and iron silicate has alternate rows of cells filled with cadmium powder to form cadmium anodes, and intermediate alternate rows of cells of the honeycomb are filled with tantalum screens impregnated with platinum black to form the catalyst cathodes. The resulting matrix containing the electrode materials is then filled by vacuum filling with 30 to 40 percent potassium hydroxide solution, with no free electrolyte liquid in the spaces provided in the cells containing the tantalum screen catalyst electrodes.

The resulting unit is then positioned in a battery as described above and illustrated generally in FIG. 4, and operated as a cadmium-air secondary battery. The resulting battery is discharged and charged over a number of one-half hour discharge - one-half hour charge cycles.

EXAMPLE 4

A porous inorganic honeycomb formed of zirconium phosphate ion exchange material has alternate rows of cells filled with manganese dioxide powder to form cathodes, with intermediate alternate rows of cells of the honeycomb receiving tantalum screens impregnated with platinum black to function as catalyst anodes.

The resulting unit formed of the zirconium phosphate honeycomb matrix containing the above electrode materials is assembled in a battery as illustrated generally in FIG. 4. In the operation of this battery, however, hydrogen is employed as the gas in the battery, such hydrogen diffusing into the cells containing the catalyst anodes. The battery is operated over a number of one-half hour discharge - one-half hour charge cycles. When employing magnesium dioxide cathodes and hydrogen as the gas to power the battery according to this embodiment, the hydrogen is oxidized at the catalyst anodes and at the magnesium dioxide cathodes a reduction reaction occurs. During charging, the opposite reactions occur, and hydrogen is liberated at the catalyst electrodes.

In addition to the solid-gas batteries or systems illustrated above, the invention principles employing a honeycomb matrix as separator and electrode support are also applicable to other systems such as a lithium-chlorine system employing lithium chloride as electrolyte, a mercuric oxide-propane system employing an acid as electrolyte, and the like.

Although in FIG. 1 of the drawing, alternate rows of cells are shown to have zinc electrodes and intermediate alternate rows catalyst electrodes, any other desired arrangement of the catalyst and active battery-type electrodes can be provided. Thus, for example, each of the rows of cells 16, 16a, 16b, etc., can contain alternating zinc and catalyst electrodes 22 and 20, as illustrated in FIG. 5.

Figure 5:
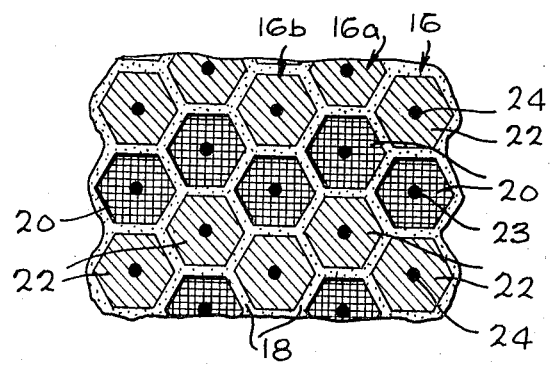
FIGS. 5, 6 and 7 illustrate various modifications of the honeycomb-electrode unit of the invention.
Figure 6:
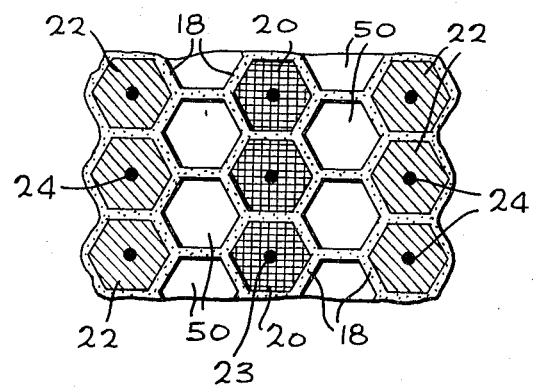

Further, although in preferred practice the catalyst electrodes are arranged adjacent the active battery electrodes, e.g., zinc electrodes, separated from each other by a single cell wall, as illustrated in FIGS. 1 and 5, the catalyst and active battery electrodes can be separated by two or more cell walls and hence need not be disposed in adjacent cells of the honeycomb. This embodiment is illustrated in FIG. 6, wherein the catalyst and zinc electrodes 20 and 22 are not disposed in adjacent cells of the honeycomb, and are separated by two cell walls 18 of the honeycomb, with empty cells 50 of the honeycomb disposed between the catalyst and zinc electrodes. But this latter arrangement is usually not preferred since it increases the internal resistance of the battery unit. However, where it is desired to promote heat transfer in the unit, e.g., for heat dissipation, such a unit permits the electrolyte to be introduced into and to circulate freely through the empty cells 50, to thus dissipate heat and also remove any undesirable products formed in the cell. For this purpose, the unit is impregnated with electrolyte in a manner so as to flood the cells 50 with electrolyte, but without introducing free electrolyte into the gas passages of the catalyst electrodes 20. Also, if desired, some of the cell walls 18 can be broken away to increase the size of some cells as compared to the normal size of the cells 14.

Figure 7:
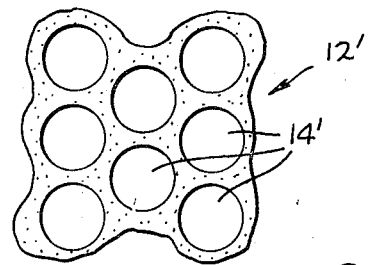

It will be understood also that the cells of the honeycomb matrix can have any desired shape. Thus, although usually such honeycombs are provided with hexagonal cells, such cells can be, for example, circular, as illustrated by the honeycomb matrix 12' in FIG. 7, containing circular cells 14', or of any other polygonal shape. Further, it will be understood that the honeycomb can be cut to any desired size, shape or configuration and can be employed to form large or small high energy density batteries, with honeycombs of any desired depth.

It will be understood also that if desired, battery electrodes, e.g., the zinc electrodes, can be covered with an insulation material, as at 28, or the ends of such active battery electrodes need not be covered with any insulation material. However, in the latter instance, reduced insulation of the active battery electrode compartments results.

Further, it will be understood that any suitable electrolyte or electrolyte solution can be used in the honeycomb battery unit of the invention, including acidic or basic electrolytes.

Thus, the invention provides a novel electrode-separator unit for a fluid or gas operable battery permitting ease of assembly of such units in a battery, providing insulation between the respective electrode compartments, and in supporting the electrodes embodied in these units. The battery containing such electrode-separator unit operates efficiently as a primary or secondary battery at both ambient and elevated temperatures.

Reference is made to U.S. applications Ser. No. 603,016 of F. C. Arrance and No. 603,017 of C. Berger, both filed Dec. 19, 1966, also relating to batteries containing a honeycomb matrix as separator.

While I have described particular embodiments of my invention for purposes of illustration within the spirit of the invention, it will be understood that this invention is not be taken as limited, except by the scope of the appended claims.

I claim:

1. A fluid operable battery comprising a case, an electrode-separator unit positioned in said case, said electrode-separator unit comprising a honeycomb matrix forming an integral continuous bonded separator, said honeycomb matrix formed of a member selected from the group consisting of a porous ceramic material, a porous plastic and an ion exchange material, said honeycomb matrix having a conductivity or porosity permitting transfer of electrolyte ions but preventing transfer of electrode ions, and having a plurality of cells defined by a continuous wall of said matrix, said matrix and said cells thereof having substantially greater depth than the thickness of said wall, a first catalyst electrode material selected from the group consisting of platinum, palladium, iridium, nickel boride and cobalt boride, and a second active battery electrode material selected from the group consisting of zinc, cadmium, lithium, silver oxide, copper oxide, manganese dioxide, and cadmium oxide, said first catalyst electrode material positioned in and contacting at least one of the cells of said honeycomb matrix, and said second active battery electrode material substantially filling and contacting at least one other of said cells of said honeycomb matrix, said first and second electrode materials being separated by the honeycomb wall, said cells containing said first catalyst electrode material containing a free fluid diffusion space therein to permit diffusion of a fluid into said last mentioned cells for contact of said fluid with said first catalyst electrode material, and a fluid zone communicating with said last-mentioned cells, first electrical connections to the first electrodes formed of said first catalyst electrode material, second electrical connections to the second electrodes formed of said second active battery electrode material, and terminals for said connections.

2. A fluid operable battery as defined in claim 1, wherein said first catalyst electrode material is positioned in a first series of cells of said honeycomb matrix and said second active battery electrode material is positioned in a second series of cells of said honeycomb matrix.

3. A gas operable battery as defined in claim 2, said first catalyst electrode material disposed on the walls of said first series of cells, and including collector electrodes in said first series of cells and in electrical contact with said catalyst electrode material on the walls of said last-mentioned cells.

4. A fluid operable battery as defined in claim 1, said honeycomb matrix being composed of a solid solution of magnesium silicate and iron silicate.

5. A fluid operable battery as defined in claim 1, said second electrode material being a zinc electrode.

6. A fluid operable battery as defined in claim 1, said first electrode material being a platinum catalyst electrode, and said second electrode material being a zinc electrode.

7. A fluid operable battery as defined in claim 1, said second electrode material being a cadmium electrode.

8. A fluid operable battery as defined in claim 1, said first electrode material being a platinum catalyst electrode, and said second electrode material being a cadmium electrode.

9. A fluid operable battery as defined in claim 1, said unit containing an electrolyte, said cells containing said first catalyst electrode material being substantially free of said electrolyte.

10. A gas operable battery as defined in claim 2, the cells containing said second electrode material being adjacent to the cells containing said first electrode material.

11. A gas operable battery as defined in claim 10, wherein said second series of cells containing said second electrode material are in alternate juxtaposition with respect to the first series of cells containing said first electrode material.

12. A gas operable battery as defined in claim 1, said honeycomb matrix being formed of a porous ceramic material selected from the group consisting of insoluble hydrous metal oxides, aluminosilicates, a solid solution of magnesium silicate and a member selected from the group consisting of zinc silicate and iron silicate, and a solid solution of aluminum-bearing material and a substance selected from the group consisting of chromium, cobalt, nickel, magnesium, calcium and iron-bearing materials.

13. A gas operable battery as defined in claim 1, said honeycomb matrix being formed of a porous ceramic material, and said second electrode material being a zinc electrode.

14. A gas operable battery as defined in claim 25, said first electrode material being a platinum catalyst electrode, and said second electrode material being a zinc electrode, and said honeycomb matrix being formed of a porous ceramic material, including an insulating material positioned over at least one end of said zinc electrodes, and closing said at least one of said electrodes.

* * * * *